United States Patent
Zwilling et al.

(10) Patent No.: US 7,395,278 B2
(45) Date of Patent: Jul. 1, 2008

(54) TRANSACTION CONSISTENT COPY-ON-WRITE DATABASE

(75) Inventors: Michael J. Zwilling, Redmond, WA (US); Lewis S. Bruck, Redmond, WA (US); Sameet H. Agarwal, Redmond, WA (US); Kangrong Yan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 646 days.

(21) Appl. No.: 10/611,774

(22) Filed: Jun. 30, 2003

(65) Prior Publication Data

US 2004/0267828 A1 Dec. 30, 2004

(51) Int. Cl.
*G06F 12/00* (2006.01)
*G06F 9/34* (2006.01)

(52) U.S. Cl. .................. 707/200; 707/201; 707/202; 711/209; 711/206; 711/202

(58) Field of Classification Search ............. 707/3–6, 707/200–202; 711/206, 209, 202
See application file for complete search history.

(56) References Cited

U.S. PATENT DOCUMENTS

| | | | | |
|---|---|---|---|---|
| 5,043,871 A * | 8/1991 | Nishigaki et al. | ........... | 707/202 |
| 5,247,672 A * | 9/1993 | Mohan | ........... | 711/152 |
| 5,426,752 A * | 6/1995 | Takahasi et al. | ........... | 711/209 |
| 5,657,440 A * | 8/1997 | Micka et al. | ........... | 714/16 |
| 5,806,078 A * | 9/1998 | Hug et al. | ........... | 707/203 |
| 5,832,508 A * | 11/1998 | Sherman et al. | ........... | 707/200 |
| 5,893,117 A * | 4/1999 | Wang | ........... | 707/203 |
| 6,041,423 A * | 3/2000 | Tsukerman | ........... | 714/19 |
| 6,243,702 B1 * | 6/2001 | Bamford et al. | ........... | 707/8 |
| 6,263,338 B1 * | 7/2001 | Ronstrom et al. | ........... | 707/8 |
| 6,363,387 B1 * | 3/2002 | Ponnekanti et al. | ........... | 707/10 |
| 6,631,374 B1 * | 10/2003 | Klein et al. | ........... | 707/8 |
| 6,668,262 B1 * | 12/2003 | Cook | ........... | 707/204 |
| 6,668,263 B1 * | 12/2003 | Cranston et al. | ........... | 707/205 |
| 6,792,432 B1 * | 9/2004 | Kodavalla et al. | ........... | 707/103 R |
| 6,792,518 B2 * | 9/2004 | Armangau et al. | ........... | 707/203 |
| 6,898,608 B2 * | 5/2005 | Hopeman et al. | ........... | 707/202 |
| 6,934,822 B2 * | 8/2005 | Armangau et al. | ........... | 711/162 |

(Continued)

OTHER PUBLICATIONS

"Auxiliary Processor Instruction for page table look-ups"—IBM dated Jun. 16, 2003.*

(Continued)

*Primary Examiner*—Jean Fleurantin
*Assistant Examiner*—Anh Ly
(74) *Attorney, Agent, or Firm*—Woodcock Washburn LLP

(57) ABSTRACT

A database view of a database is created which provides a transaction-consistent view of an existing database at a previous time. Each database view contains all the information needed to, along with the primary database, determine the contents of the primary database at a previous time. The database view consists of a side file corresponding to each data file in the primary database. The side files contain a copy of all data from the corresponding data file which has been changed since the database view was created. Sparse files may be used for the side files in order to conserve space. Page table data is kept in order to allow a quick determination as to whether the page from the primary database has been modified and the old version stored in the database view side file.

35 Claims, 5 Drawing Sheets

U.S. PATENT DOCUMENTS

| | | | | |
|---|---|---|---|---|
| 6,957,362 | B2* | 10/2005 | Armangau | 714/20 |
| 7,035,881 | B2* | 4/2006 | Tummala et al. | 707/204 |
| 7,191,304 | B1* | 3/2007 | Cameron et al. | 711/202 |
| 7,237,076 | B2* | 6/2007 | Nakano et al. | 711/162 |
| 2002/0091718 | A1* | 7/2002 | Bohannon et al. | 707/202 |
| 2003/0204534 | A1* | 10/2003 | Hopeman et al. | 707/200 |
| 2004/0054643 | A1* | 3/2004 | Vemuri et al. | 707/1 |
| 2004/0199549 | A1* | 10/2004 | Oksanen | 707/201 |
| 2005/0050295 | A1* | 3/2005 | Noel et al. | 711/206 |

OTHER PUBLICATIONS

"Invalidate Page table entry processures"—IBM TDB, Junod, DM, Partridge, RL, (pp. 1-4) dated Jan. 1, 1976.*

Elnozahy(Mootaz) E.N. et al., "A Survey of Rollback-Recovery Protocols in Message-Passing Systems", *ACM Computing Surveys*, Sep. 2002, 34(3), 375-408.

Mohan, C. et al., "Aries: A Transaction Recovery Method Supporting Fine-Granularity Locking and Partial Rollbacks Using Write-Ahead Logging", *ACM Transactions on Database Systems*, 1992, 17(1), 94-162.

* cited by examiner

TRANSACTION CONSISTENT COPY-ON-WRITE DATABASE

FIELD OF THE INVENTION

This invention relates in general to the field of database systems. More particularly, this invention relates to creating a transaction-consistent copy of a database.

BACKGROUND OF THE INVENTION

Databases and database products are in common use today. A database stores information in objects, such as records, tables, and indexes. In addition to a current version of the information stored in a database, previous versions of the information may be useful to a user.

One way to provide information on previous versions of data is to make a complete copy of the database at a point in time which may be of interest to a user. When this occurs, all files associated with the database are stored. However, this technique is space intensive, because for a database which is stored in a certain amount of storage space, each copy will also require that amount of storage space. This approach may also be time consuming, as the copy itself involves movement of lots of data.

A disk volume snapshot may be provided using a copy-on-write mechanism that stores only a copy of the changed data. Each time a change is made to the original database, the previously stored data is written to the copy of the changed data. However, this volume snapshot is not transactionally consistent. That is, the changes stored may be part of a transaction in progress, and thus the volume snapshot may include partial information regarding a transaction. Special hooks are necessary for applications to use the volume snapshot because of this possible transaction inconsistency. A volume snapshot created in this way may also be structurally inconsistent due to incomplete structural modifications of indices and tables which have been stored. Additionally, in a volume snapshot, the granulatity of the copy is at the volume level. Non-database data may also be copied, which is unnecessary, wasting time and resources.

Versioning of databases has also been provided by making available the data accessed by a particular transaction. Only this data is stored for a given transaction, and thus if data regarding what was accessed by a given transaction is needed, the data accessed (before any changes made by the transaction) may be provided to the user who initiated the transaction. However, this data is not accessible by multiple transactions or users. Where multiple transactions or users attempt to access the same data, the data may be different for these different accesses. Additionally, such versioning is not persistent after a database server restart.

Thus, there is a need for a way to view a database which can be created quickly, is transaction-consistent, provides consistent information to multiple transactions or users, and is persistent after a database server restart.

SUMMARY OF THE INVENTION

A database view of a database is created which provides a transaction-consistent view of an existing database at a previous time (the time when the database view was created) without creating a complete copy of the database. The primary database is the database which is being used and of which one or more database views are being created.

Each database view contains all the information needed to, along with the primary database, determine the contents of the primary database at a previous time. The database view consists of a side file corresponding to each data file in the primary database. A side file contains a copy of all data from the corresponding data file which has been changed since the database view was created.

In one embodiment, a database view of a database is implemented. The database includes data elements and is associated with a transaction log. The transaction log includes both active transactions and inactive transactions. The database view includes storage of differences ("difference storage") between the current version of the database and a prior version. This is stored in files known as side files.

Wherever new data has been written to the database, a copy of the data in the prior version is stored to the difference storage. If another change is made, then difference storage already contains a copy of the data in the prior version, and so no new data is stored.

In one embodiment, the transaction log is analyzed, and a split point on said transaction log is identified. Each transaction in the log prior to the split point which performs modifications is found, and the results of the modifications are written to the difference storage. Modifications caused by active transactions on the transaction log are then undone in the database view by updating the database view to undo the transactions. In this way, a transaction-consistent view of the database as of the split point is provided.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
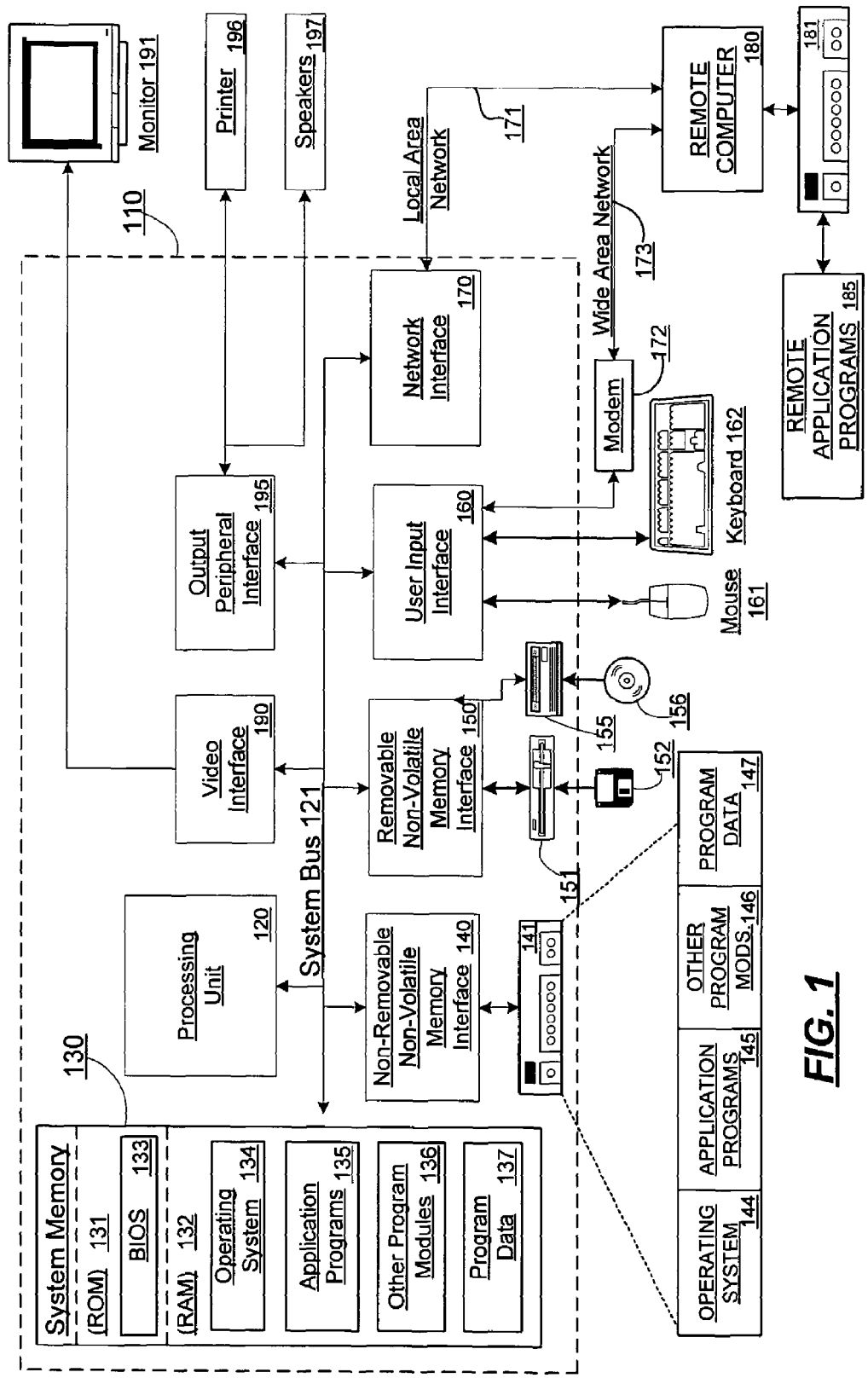
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The Database and Database View

Figure 2:
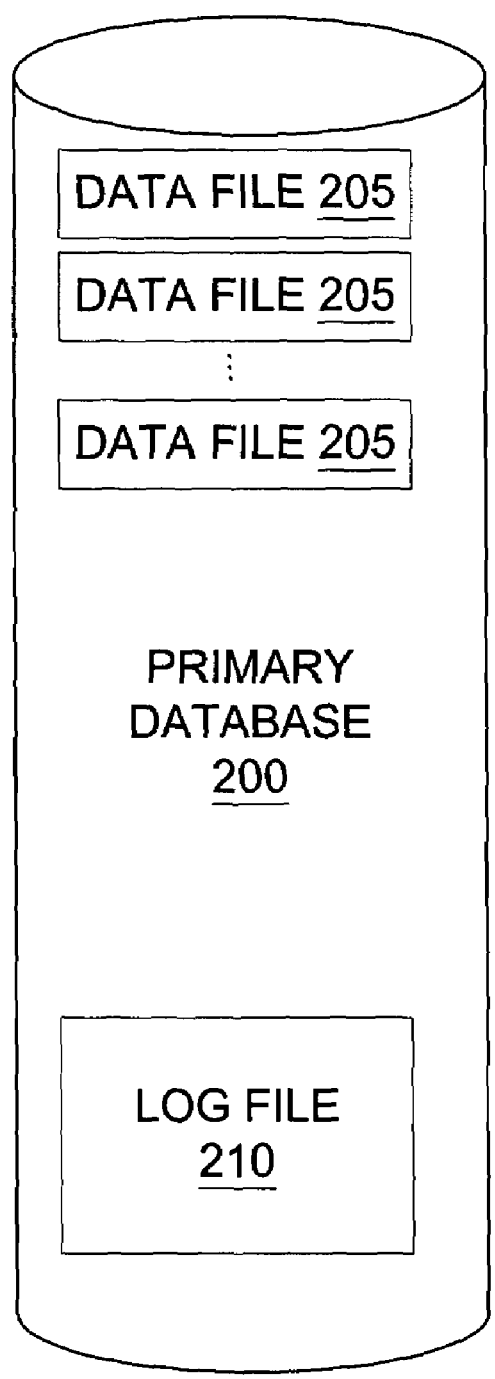
FIG. 2 is a block diagram of a database in accordance with one embodiment of the invention.

Generally, a database consists of files of two types: data files and log files. Log files contain a series of log records which describe changes which have been made over time to the database files. Log records may be identified with a log sequence number (LSN). As shown in FIG. 2, in one embodiment, the primary database 200 consists of a set of data files 205 and a log file 210. Data files are divided in to blocks of storage called pages.

A database view for a database is created which provides a transaction-consistent view of an existing database at a previous time without creating a complete copy of the database. A database view, in combination with the database, contains all the information necessary to produce a copy of the database at the previous time. The database view, however, does not in itself contain all of the information, and thus can be smaller in size than a full copy would be. Additionally, a view is created on-the-fly as modifications are made to the database, which allows the costs (time and processing) to be spread over time. If a copy was made of the database view at the prior time, the time and processing cost would be concentrated at one time. Additionally, a database view can be created while update activity continues on the database. The primary database is the database which is being used and of which one or more database views are being created.

As described above, a database view contains all the information needed to, along with the primary database, determine the contents of the primary database at a previous time. The database view consists of a side file corresponding to each data file in the primary database. A side file contains a copy of all data from the corresponding data file which has been changed since the database view was created. In one embodiment, in order to avoid the need for mapping table from pages in the side file to pages in the primary file, the side files are stored in sparse files. In a sparse file only the portions of the file that are actually written to need storage space. All other regions of the file are unallocated. In other embodiments, the storage for the side files is not in sparse files.

In one embodiment, the sparse file mechanism works with a standard region size. If data within one region is written to the sparse file, even if the data does not fill the entire region, space for the entire region is allocated. Because this space is allocated and can be read from, a distinction must be made between areas of the region filled with valid data, and areas of the region which exist because the granularity of the sparse file requires a region of a certain size to be allocated if any storage within that region is needed.

Because the database view contains the original value of all of the data which has been changed in the primary database since the database view was created, the database data as of the time of the creation of the database view may be read from the database view. In order to respond to a request for data from the database view, data is read from the database view's side files, if the side files contain data for the request. The data to be read which is not present in the side files has not been changed since the database view was created, and is read from the primary database.

In one embodiment, the side files contain pages of data from the primary database. When any data on any page of the primary database is changed, the page of data is stored in the side file. The invention is described with reference to pages as the unit of data in the primary database; however, it is contemplated that other units of data for the primary database may be used.

In order to determine which data has been written to the side file and which data should be read from the primary database, the presence of valid data in the side file must be ascertained. In one embodiment, it is read directly to ascertain if valid data exists. In another embodiment, a side page table is created which stores data regarding whether a given page exists and is valid.

In one embodiment, for each page in the primary database, the side page table stores information regarding whether the page should be read from the primary database, indicating that it has not changed, or whether the page should be read from a side file, because it has changed. The side page table allows a fast determination of whether a given page exists in the side file.

One-Bit and Two-Bit Page Tables

In one embodiment, the side file and the sparse file mechanism both use the same page/region size. That is, the pages that the side file stores from the primary database are the same size as the regions which the sparse file stores when any memory is written into the sparse file. For example, if the sparse file regions are 8 KB and the pages stored from the primary database are also 8 KB, the page size and the region size are equal. In this case, any region which is filled will be filled completely by the page read from the primary database, and there is no possibility that invalid data is stored in the region.

In another embodiment, a number of side file regions will correspond exactly to each page. For example, if the sparse file regions are 8 KB (kilobytes) and the pages stored from the primary database are 16 KB, then each page stored in the side file will fill two regions. In this case, as well, any region which is filled will be filled completely by contents from the page read from the primary database. Again, there is no possibility that invalid data is contained in the region.

For these embodiments, the side page table comprises an in-memory bitmap which holds one bit of information for each page in the side file. For each page in the side file, the corresponding bit indicates whether the page is in the side file.

In another embodiment, the granularity of the side file region is larger than the granularity of the pages stored from the primary database. For example, if each region of the side file is 64 KB and the size of the pages is 8 KB, then the presence of a region in the side file does not necessarily indicate that all information in the region is valid data from the primary database. If only one page is copied to the side file, in the example, only 8 KB of the 64 KB in the allocated region will contain valid data. In another embodiment, some side file pages are spread across regions.

For these embodiments, the side page table comprises two in-memory bitmaps which hold two bits of information for each page in the side file, which we will term bit1 and bit2. For each page in the side file, the corresponding bits indicate (bit1) whether the page is definitely in the side file, and (bit2) whether the page is potentially in the side file. Bit2 may also be thought of as indicating that the region in which the page would be stored in the side file has been allocated. However, as discussed below, in one embodiment, this bit2 is set only when the side page table is reconstructed.

The bitmaps are maintained in-memory and therefore may not be persistent. If they are erased, the bitmaps are reconstructed from the sparse file information. The sparse file is consulted, and, for each page, if the side file has allocated memory for the region in which the page is located, bit2 is set to indicate that the page is potentially in the side file. For each page, bit1 is initially set to indicate that it is not definite that the page is in the side file.

If the side page table is maintained in such a way that it is persistent, then the granularity of the regions and the pages may be disregarded, and the one-bit side page table may be used. However, in one embodiment, in order to support a persistent database view after a database server restart, the two-bit page table is used.

In one embodiment, no page table is created for the side files. In this case whenever it is necessary to determine whether a copy has been made of a page in the database view, the database view is consulted. The invention will be described below with reference to an embodiment in which a one-bit or a two-bit page table exists, however, embodiments in which there is no page table, and the database view must be examined to determine whether it contains a page copied from the primary database are also contemplated.

Figure 3:
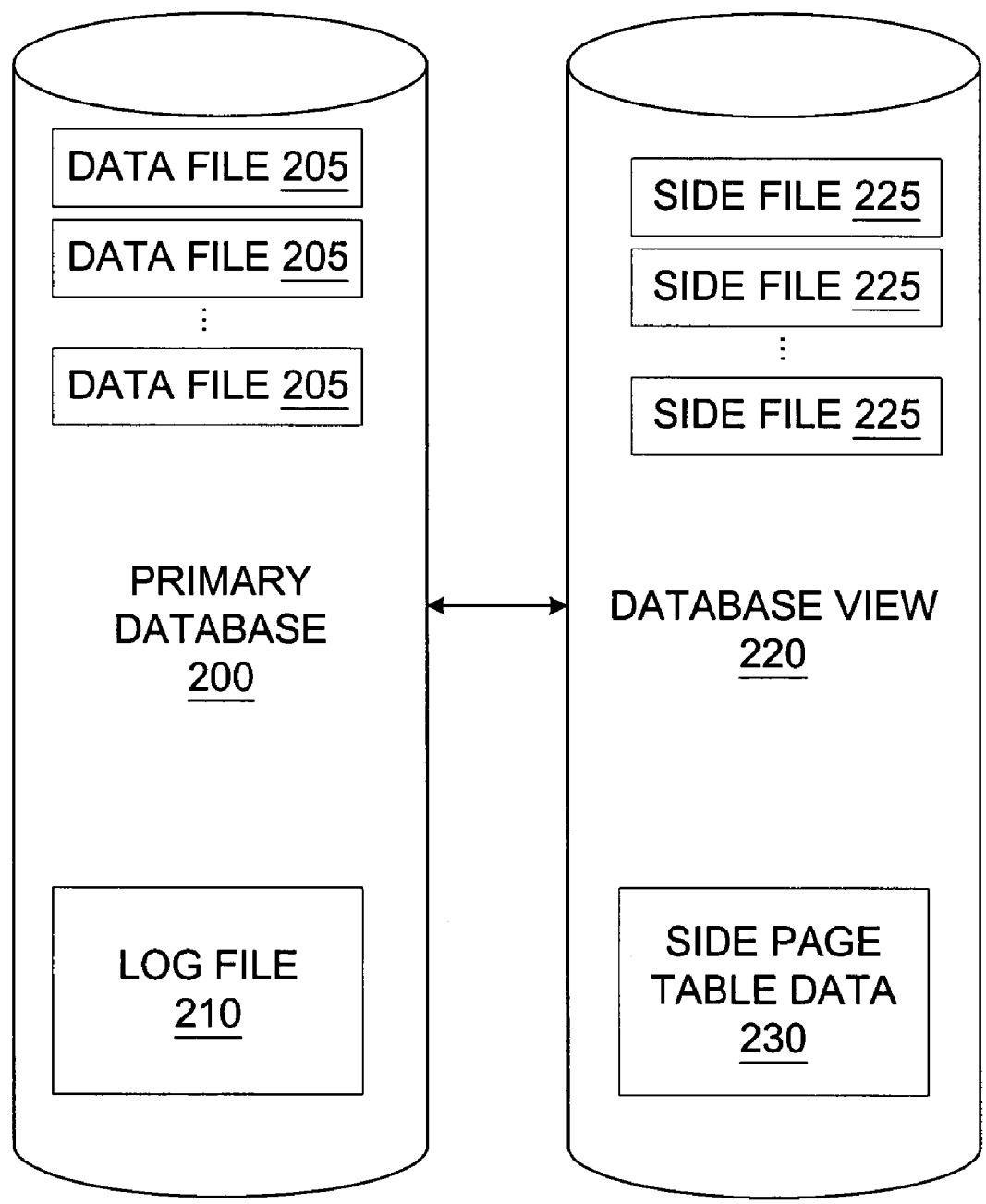
FIG. 3 is a block diagram of a database view and a database in accordance with one embodiment of the invention.

As shown in FIG. 3, the database view 220 for primary database 200 consists of side files 225. Each of the data files 205 in primary database 200 has a corresponding side file 225 in the database view 220. Additionally, side page table data 230 is stored in-memory for the database view 220. In one embodiment, side page table data 230 is one side page table which covers all of the side files 225. In another embodiment, a separate side page table exists for each of side files 225.

Transaction Log

In a database, the transaction log is a serial record of all the transactions that have been performed against the database since the transaction log was last backed up. The transaction log is used to recover the database to a point of failure. In one embodiment, the transaction log is modeled as a circular queue. A transaction log may be truncated by deleting an inactive portion of the log. This inactive portion contains completed transactions which do not need to be recovered. Conversely, the active portion of the transaction log contains both completed transactions and transactions that are still running and have not yet completed (active transactions.) Truncation is done to minimize inactive space in the transaction log instead of allowing the transaction log to continue to grow and use more space.

Active transactions may cause transaction-inconsistency. For an active transaction, some modifications of data files may not have been written from the buffer cache to the data files, and there may be some modifications from incomplete transactions in the data files. The log file is used to ensure that a recovery of the database is transaction consistent. This is done using ARIES (Algorithms for Recovery and Isolation Exploiting Semantics)-style recovery. Every modification recorded in the log which may not have been written to the data files is rolled forward by performing the modification on the database. To ensure the integrity of the database, every incomplete transaction found in the transaction log is rolled back by undoing the modification on the database.

Creating a Database View

In order to create a database view, the physical structures (the side files and page tables) of the database view must be initialized. First a side file 225 is created for each data file 205 in the primary database 200. As discussed above, a side file may be sparse file or, in another embodiment, may be a non-sparse file of the same size as the data file 205. Side file 225s are associated with the data files 205 in the primary database 200.

Because transactions are continuously occurring and the database view is transaction consistent, the transaction log must be used during the creation of a database view. In order to ensure that information regarding transactions which must be used for the database view is not discarded, log truncation (if it exists) is disabled on the primary database 200.

In one embodiment, a side page table 230 is initialized for the database view. Initially, the side page table is set to indicate that no pages exist in side file 225, and, in the case of a two-bit side page table, that no pages are potentially or definitely in side file 225.

Figure 5:
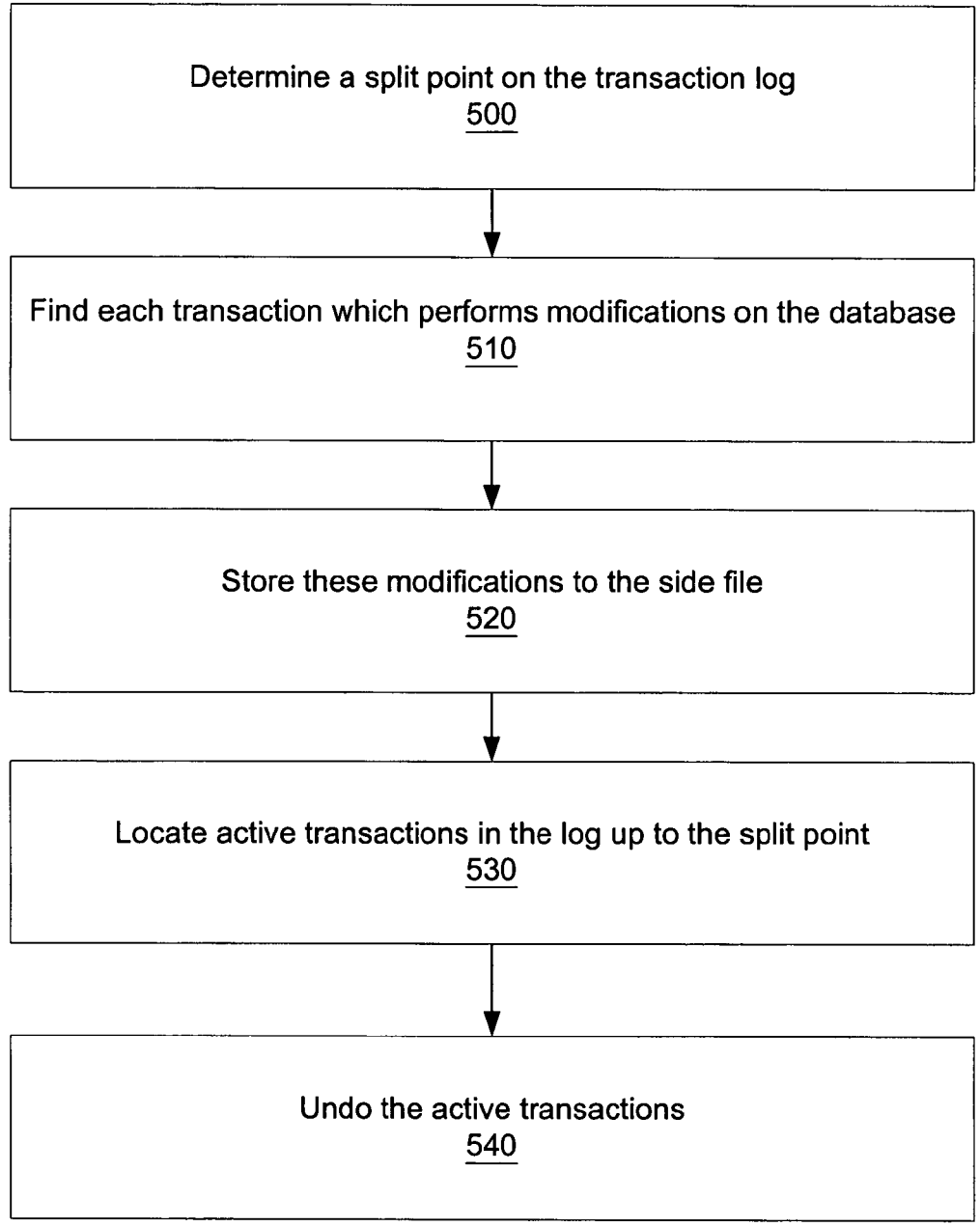
FIG. 5 is a flow diagram of a method for implementing a transaction-consistent view of a database according to one embodiment of the invention.

When the initialization is completed, the database view is ready to go "online". The database view will now be running alongside the primary database 200, and when modifications are performed, copies of the original values of the modified pages (i.e. the pages' contents before the updates are performed) will be stored in the database view. FIG. 5 is a flow diagram of a method for implementing a transaction-consistent view of a database according to one embodiment of the invention. As shown in FIG. 5, step 500 a split point is determined on the transaction log. This split will correspond to the point in time that the database view represents. The LSN of the end of the log on the primary database 200 is obtained when the database view is created; this LSN is the "split point" at which the primary database 200 and the database view 220 will start diverging. The primary database 200 is then marked so that database view processing is required. Database view support in the primary database 200 as described below, begins.

In order for the database view to be consistent, the log of the primary database 200 prior to the split point must be analyzed to determine what transactions were active at the time of the split. The oldest active (as of the split point) transaction in the log is identified. Log truncation is enabled before that oldest active transaction.

Figure 4:
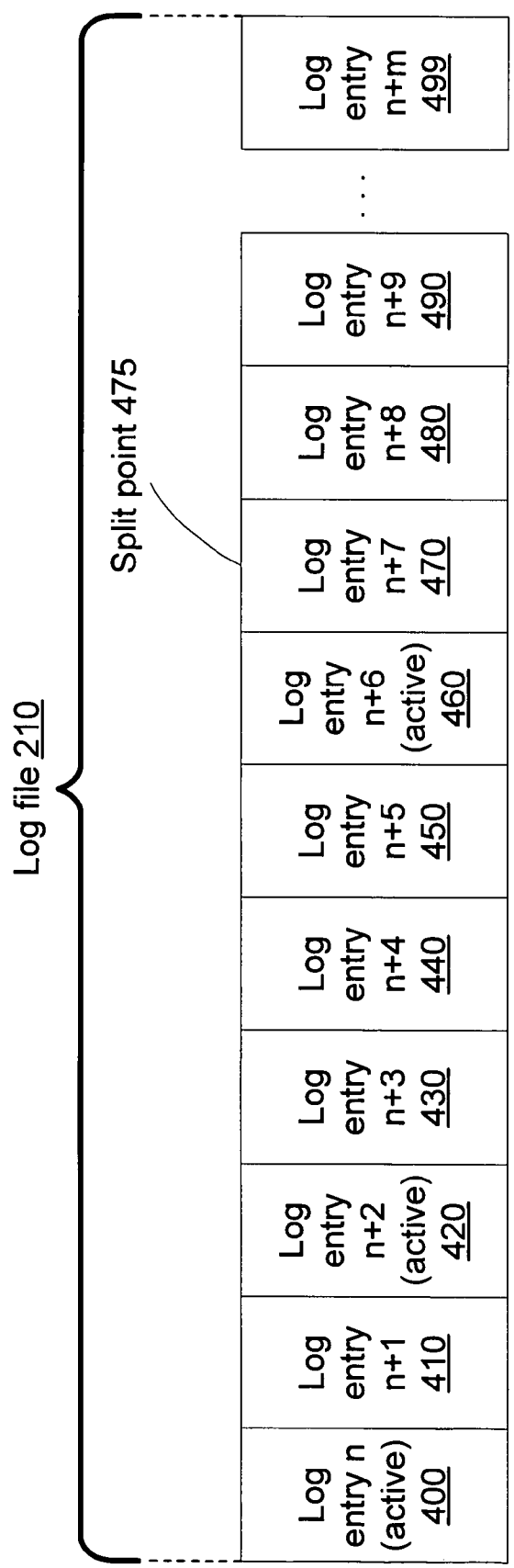
FIG. 4 is a block diagram of an example transaction log in accordance with one embodiment of the invention.

In a manner similar to ARIES (Algorithms for Recovery and Isolation Exploiting Semantics)-style recovery, all the operations in the log of the primary database 200 from the oldest active transaction prior to the split point are performed to the database view. FIG. 4 is a block diagram of an example transaction log, log file 210, according to a preferred embodiment of the invention. Log entries in log file 210 include log entries 400, 410, 420, 430, 440, 450, 460, 480, 480, 490 and 499. A split point 475 is determined. Transactions continue being written to the log, however truncation is disabled. The log file 210 is examined, and any modifications to the database as a result of transactions from the oldest active transaction to the split point (from log entry n 400 through log entry n+7, in the example in FIG. 4) are performed to the side files 225. The result of the modifications in each of these transactions is stored in the side files 225. Then, these transactions are examined. Modifications written to the log file by any active transactions in the log, such as log entry n 400, log entry n+2 420, and log entry n+6, are undone in the side files 225.

As seen in FIG. 5, step 500, a split point is selected on the transaction log. Next, in step 510, each transaction which performs modifications on the database is found. In one embodiment, the transaction is analyzed, and if the effect of the transaction is to write a certain value to a certain location in the database, as seen in step 520, that value is saved in the corresponding location in the side files, using the method for modifying a database view detailed below. In this way, all changes which may still need to be written to the database (changes in "dirty pages", e.g.) are stored for the database view.

Some transactions, however, may not yet have been committed. Therefore, these active transactions in the log up to the split point must be located (step 530) and undone (step 540). In one embodiment, where an incomplete transaction changes the value for a certain location in the database, the change, which has been added to the side file above, is removed from the side file. In an alternate embodiment, the undoing of a transaction is done by modifying the database view, as detailed below, setting the data in the side file to match the data in the database as of the split point.

In this way, only the completed transactions from the log are reflected in the database view. When the transactions on the log are reflected in the database view, with the exception of transactions active when the split point occurred which have been undone, log truncation is enabled on the primary database 200. Because database view processing has been enabled, the database view will be updated as changes are made to the primary database 200, and so the database view can be used to determine the contents of the primary database 200 as of the time of the split point.

Recovering a Database View

When the database server restarts after it is shut down (either normally or abnormally), the database view must be reinitialized. In order to do so, the side page tables, which have been stored in memory, must be reinitialized.

In order to reinitialized the side page table, in a two-bit side page table implementation, for each region in the side page table that has been allocated, the data (bit2) in the side page table for each page in a region that has been allocated is set to indicate that the page may possibly have been written to side file 225. The data in the side page table for all other pages is set to indicate that there is no possibility that the page was written to side file 225. It is not definite, however, that the page was written to side file 225, and and therefore bit1 is not set initially.

Alternatively, either in the two-bit side page table implementation or in the one-bit side page table implementation, side file 225s may be examined to determine, for each page, if the page in side file 225 is valid, as described above. The page table is set to indicate, for each page which does exist, that the page does actually exist in side file 225. All other pages are set to indicate that the page does not exist in side file 225.

Database View Support in the Primary Database

In order for the database view to store information from the primary database 200 before the data is overwritten, the primary database 200 must support the creation of a database view. For each page that the primary database 200 modifies, a determination must be made as to whether the page is in the database view. If the page exists in the database view, then it is the correct version of the page. For example, this may have been when a previous modification had been made to that page in the primary database 200. If the page is changed again in the primary database 200, the version in the database view should not change.

When the information is received from the primary database 200 that a page is being changed, if the page is in side file 225, nothing should be done. If the page is not in side file 225, the page should be written to side file 225, and the correct bit should be set in the side page table. In the case where there is a two-bit page table, there are three possibilities for bit1 and bit2 for the page, as indicated by the following Table 1:

TABLE 1

Cases for Two-Bit Page Table

|  | Bit1 indicates that the page is definitely in the side file | Bit1 does not indicate that the page is definitely in the side file |
|---|---|---|
| Bit2 indicates that the page is possibly in the side file | Case 1: page is in the side file | Case 2: page is possibly in the side file |
| Bit2 indicates that the page is definitely not in the side file | Case 1: page is in the side file [alternately: Case 4: invalid] | Case 3: page is definitely not in the side file |

In one embodiment, when bit1 indicates that the page is definitely in side file 225, bit2 is ignored; thus, as shown in Table 1, where bit1 indicates that the page is definitely in side file 225, the page is assumed to be in side file 225 no matter what bit2 indicates. In an alternate embodiment, when bit1 is set to indicate that the page is definitely in side file 225, bit2 is set to indicate that the page is possibly in side file 225, and in this alternate embodiment, when bit1 indicates that the page is definitely in side file 225 yet bit2 indicates that the page is definitely not in side file 225, the case is invalid and an error has been encountered.

When the primary database 200 indicates that a page is being changed, for a two-bit page table, the actions which should be taken for the cases listed above are as follows:

Case 1: Do nothing.
Case 2: Determine if the page is in side file 225, if it is not, write the page to side file 225.
Case 3: Write the page to side file 225.

When the page is written to side file 225, in either Case 1 or Case 2 the old version of the page in the primary database 200 (the version now being modified by the primary database 200) is written to side file 225. Additionally, the page table is set to indicate that the page is now in side file 225 so that any subsequent writes to the page will be handled according to Case 1, and the correct page for the database view remains stored in side file 225.

In order to determine if the page is in side file 225 in Case 2, data corresponding to the page is read from side file 225. If the data is valid then a previous version of the page is in side file 225, then it should not be overwritten. In one embodiment, the page table bit1 corresponding to the page is set to indicate that the page is definitely in side file 225, so future writes to the page are handled under Case 1.

Data invalidity may be indicated by data placed in newly allocated regions to indicate that no valid data has yet been written to the region. For example, all zeros may be written to a newly allocated region, if it is known that no page of the database will ever contain all zeros. If this is the case, then the presence of the page in side file 225 is indicated by the corresponding page in side file 225 being part of an allocated region and containing some non-zero data.

Reading a Database View

The cases detailed in Table 1 are also useful for performing a read of data stored in a database view. When data in a page is being read from a database view, the page should be read from side file 225 if it exists in side file 225. If it does not, the page should be read from the primary database 200. In a two-bit page table system, the actions which should be taken for the three cases are as follows:
  Case 1: Read the page from side file 225.
  Case 2: Determine if the page is in side file 225, if it is, read the page from side file 225, if it is not, read the page from the primary database 200.
  Case 3: Read the page from the primary database 200.

Modifying a Database View

The database view represents the state of a database at a prior point in time. A user may choose to use the database view as a database. For example, the user may choose to perform an action on the database view, to create a database view of the database as it would have been had the action been performed on the database view at the prior point in time. Additionally, during initialization, as detailed above, transactions may be performed and undone on the database view.

To modify the database view, the modification should be based on the data in the database view and the resulting page should be stored in the database view. If no data exists in the database view for the page, then the modification should be based on the data in the primary database 200, and the resulting page should be stored in the database view.

In a two-bit page table system, the actions which should be taken for the three cases are as follows:
  Case 1: Read the page from side file 225, perform modifications, write the page to side file 225.
  Case 2: Determine if the page is in side file 225, if it is, proceed as in case 1, if it is not, proceed as in case 3.
  Case 3: Read the page from the primary database 200, write the page to side file 225 and set the page table to indicate that the page is in side file 225. Perform modifications to the page and write the modified page to side file 225 when appropriate.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for providing a database view comprising transaction-consistent data reflecting the contents of a database at a specific point in time, said database comprising data elements and associated with a transaction log, said transaction log comprising active transactions and inactive transactions, said database view comprising difference storage for storing prior versions of at least one of said data elements from said database, said method comprising:
  determining a split point on said transaction log corresponding to said point in time;
  identifying each transaction on said transaction log prior to said split point which performs modifications on said database;
  storing each of said modifications in said difference storage;
  maintaining a side page table that comprises information regarding whether each data element is stored in the difference storage and whether each data element is allocated in the difference storage;
  identifying each active transaction on said transaction log prior to said split point;
  undoing any corresponding modifications in said difference storage;
  storing said difference storage;
  accepting a request for a specific data element in said database view;
  determining if data is stored in a location corresponding to said specific data element in said difference storage:
  responding to said request by reading said difference storage if data is stored in a location corresponding to said specific data element in said difference storage: and
  responding to said request by reading said database if data is stored in a location corresponding to said specific data element in said difference storage.

2. The method of claim 1, further comprising:
  initializing said difference storage.

3. The method of claim 1, wherein said determining said split point on said transaction log corresponding to said point in time timber comprises disabling log truncation.

4. The method of claim 1, wherein said method further comprises initializing said side page table.

5. The method of claim 1, wherein said step of undoing any corresponding modifications in said difference storage comprises deleting said corresponding modifications.

6. The method of claim 1, wherein said step of undoing any corresponding modifications in said difference storage comprises:
  reading corresponding unmodified data in said database; and
  writing said corresponding unmodified data in said difference storage.

7. The method of claim 1, wherein each of said data elements comprises a page of data.

8. The method of claim 7, wherein said difference storage comprises at least one sparse file.

9. The method of claim 8, wherein said step of storing each of said modifications in said difference storage comprises allocating a region of memory in one of said sparse files.

10. The method of claim 9, where each of said data elements comprises a page of data, and where said side page table comprises, for each page:

first stored data indicating whether said page has been stored in said difference storage; and second stored data indicating whether said region has been allocated in said difference storage.

11. The method of claim 10, where said method further comprises:

detecting that said side page table is invalid;

for each region in said sparse files, determining whether said region has been allocated;

for each region in said sparse files, setting said second stored data based on whether said region has been allocated.

12. The method of claim 10, where a determination of whether data is stored in a specific page in said difference storage comprises:

checking said first stored data, and if said first stored data indicates that said specific page has been stored in said difference storage, determining that data is stored in said specific page in said difference storage;

checking said second stored data, and if said second stored data indicates tat said region has not been allocated in said difference storage, determining tat data is not stored in said specific page in said difference storage; and if said first stored data does not indicate that said page has been stored in said difference storage and said second stored data does not indicate tat said region has not been allocated in said difference storage, reading page data from a corresponding area of said difference storage for said specific page, and determining if said page data from said corresponding area is valid.

13. The method of claim 7, where said side page table comprises, for each page:

first stored data indicating whether said page has been stored in said difference storage.

14. The method of claim 13, where a determination of whether data is stored in a specific page in said difference storage comprises:

checking said first stored data, and if said first stored data indicates that said specific page has been stored in said difference storage, determining that data is stored in said specific page in said difference storage; and if said first stored data does not indicate that said specific page has been stored in said difference storage, reading page data from a corresponding area of said difference storage for said specific page, and determining if said page data from said corresponding area is valid.

15. The method of claim 1, where said step of determining if data corresponding to said at least one data element is stored in said difference storage comprises determining if the data corresponding to said at least one data element is valid.

16. The method of claim 1, where said step of determining if data corresponding to said at least one data element is stored in said difference storage comprises consulting the side page table.

17. The method of claim 1, where said method further comprises:

detecting a modification made to said database storing a first specific value to a location in said database in place of a second specific data element;

determining if a corresponding location in said database view contains valid data;

if said corresponding location in said database view does not contain valid data, writing said second specific data element in said corresponding location.

18. At least one of an operating system, a computer-readable storage medium having stored thereon a plurality of computer-executable instructions, a co-processing device, and a computing device for performing the method of claim 1.

19. A computer-readable storage medium for providing a database view comprising transaction-consistent data reflecting the contents of a database at a specific point in time, said database comprising data elements and associated with a transaction log, said transaction log comprising active transactions and inactive transactions, said database view comprising difference storage for storing prior versions of at least one of said data elements from said database, said computer-readable medium with instructions to perform acts comprising:

determining a split point on said transaction log corresponding to said point in time;

identifying each transaction on said transaction log prior to said split point which performs modifications on said database;

storing each of said modifications in said difference storage;

maintaining a side page table that comprises information regarding whether each data element is stored in the difference storage and whether each data element is allocated in the difference storage;

identifying each active transaction on said transaction log prior to said split point;

undoing any corresponding modifications in said difference storage;

storing said difference storage;

accepting a request for a specific data element in said database view;

determining if data is stored in a location corresponding to said specific data element in said difference storage;

responding to said request by reading said difference storage if data is stored in a location corresponding to said specific data element in said difference storage; and responding to said request by reading said database if data is stored in a location corresponding to said specific data element in said difference storage.

20. The computer-readable storage medium of claim 19, said acts further comprising:

initializing said difference storage.

21. The computer-readable storage medium of claim 19, said determining said split point on said transaction log corresponding to said point in time further comprising:

disabling log truncation.

22. The computer-readable storage medium of claim 19, where said acts further comprise:

initializing said side page table.

23. The computer-readable storage medium of claim 19, where said step of undoing any corresponding modifications in said difference storage comprises:

deleting said corresponding modifications.

24. The computer-readable storage medium of claim 19, where said step of undoing any corresponding modifications in said difference storage comprises:

reading corresponding unmodified data in said database; and writing said corresponding unmodified data in said difference storage.

25. The computer-readable storage medium of claim 19, where each of said data elements comprises a page of data.

26. The computer-readable storage medium of claim 25, where said difference storage comprises at least one sparse file.

27. The computer-readable storage medium of claim 26, where said act of storing each of said modifications in said difference storage comprises allocating a region of memory in one of said sparse files.

28. The computer-readable storage medium of claim 27, where each of said data elements comprises a page of data, and where said side page table comprises, for each page:
first stored data indicating whether said page has been stored in said difference storage; and
second stored data indicating whether said region has been allocated in said difference storage.

29. The computer-readable storage medium of claim 28, where said acts further comprise:
detecting that said side page table is invalid;
for each region in said sparse files, determining whether said region has been allocated;
for each region in said sparse files, setting said second stored data based on whether said region has been allocated.

30. The computer-readable storage medium of claim 28, where a determination of whether data is stored in a specific page in said difference storage comprises:
checking said first stored data, and if said first stored data indicates that said specific page has been stored in said difference storage, determining tat data is stored in said specific page in said difference storage;
checking said second stored data, and if said second stored data indicates that said region has not been allocated in said difference storage, determining that data is not stored in said specific page in said difference storage; and
if said first stored data does not indicate that said page has been stored in said difference storage and said second stored data does not indicate tat said region has not been allocated in said difference storage, reading page data from a corresponding area of said difference storage for said specific page, and determining if said page data from said corresponding area is valid.

31. The computer-readable storage medium of claim 25, where said side page table comprises, for each page:
first stored data indicating whether said page has been stored in said difference storage.

32. The computer-readable storage medium of claim 31, where a determination of whether data is stored in a specific page in said difference storage comprises:
checking said first stored data, and if said first stored data indicates that said specific page has been stored in said difference storage, determining that data is stored in said specific page in said difference storage; and
if said first stored data does not indicate that said specific page has been stored in said difference storage, reading page data from a corresponding area of said difference storage for said specific page, and determining if said page data from said corresponding area is valid.

33. The computer-readable storage medium of claim 19, where said step of determining if data corresponding to said at least one data element is stored in said difference storage comprises determining if the data corresponding to said at least one data element is valid.

34. The computer-readable storage medium of claim 19, where said step of determining if data corresponding to said at least one data element is stored in said difference storage comprises consulting the side page table.

35. The computer-readable storage medium of claim 19, where said computer-readable medium further comprises:
detecting a modification made to said database storing a first specific value to a location in said database in place of a second specific data element;
determining if a corresponding location in said database view contains valid data;
if said corresponding location in said database view does not contain valid data, writing said second specific data element in said corresponding location.

* * * * *

UNITED STATES PATENT AND TRADEMARK OFFICE
CERTIFICATE OF CORRECTION

| | | |
|---|---|---|
| PATENT NO. | : 7,395,278 B2 | Page 1 of 1 |
| APPLICATION NO. | : 10/611774 | |
| DATED | : July 1, 2008 | |
| INVENTOR(S) | : Michael J. Zwilling et al. | |

It is certified that error appears in the above-identified patent and that said Letters Patent is hereby corrected as shown below:

Column 12, line 29; claim 1, delete "storing said difference storage."

Column 12, lines 30-31; claim 1, delete "a specific data element in said database view" and insert -- at least one data element --, therefor.

Column 12, lines 32-33; claim 1, delete "is stored in a location corresponding to said specific data element" and insert -- corresponding to said at least one data element is stored --, therefor.

Column 12, lines 35-36; claim 1, delete "is stored in a location corresponding to said specific data element" and insert -- corresponding to said at least one data element is stored --, therefor.

Column 12, lines 38-39; claim 1, delete "is stored in a location corresponding to said specific data element" and insert -- corresponding to said at least one data element is not stored --, therefor.

Column 14, line 28; claim 19, delete "storing said difference storage."

Column 14, lines 29-30; claim 19, delete "a specific data element in said database view" and insert -- at least one data element --, therefor.

Column 14, lines 31-32; claim 19, delete "is stored in a location corresponding to said specific data element" and insert -- corresponding to said at least one data element is stored --, therefor.

Column 14, lines 34-35; claim 19, delete "is stored in a location corresponding to said specific data element" and insert -- corresponding to said at least one data element is stored --, therefor.

Column 14, line 37; claim 19, delete "is stored in a location corresponding to said specific" and insert -- corresponding to said at lease one --, therefor.

Column 14, line 38; claim 19, insert -- is not stored -- after "element."

Signed and Sealed this
Fourteenth Day of February, 2012

David J. Kappos
*Director of the United States Patent and Trademark Office*